United States Patent
Kim et al.

(10) Patent No.: US 8,542,375 B2
(45) Date of Patent: *Sep. 24, 2013

(54) HOST APPARATUS, IMAGE FORMING APPARATUS, AND DIAGNOSIS METHOD FOR IMAGE FORMING APPARATUS

(75) Inventors: Hyun-cheol Kim, Seongnam-si (KR); Tae-yoon Hwang, Suwon-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 805 days.

This patent is subject to a terminal disclaimer.

(21) Appl. No.: 12/472,676

(22) Filed: May 27, 2009

(65) Prior Publication Data

US 2010/0020360 A1    Jan. 28, 2010

(30) Foreign Application Priority Data

Jul. 28, 2008 (KR) ........................ 10-2008-0073624

(51) Int. Cl.
*H04N 1/00* (2006.01)
(52) U.S. Cl.
USPC ....... 358/1.14; 358/1.15; 358/3.01; 358/3.26; 358/406; 358/474; 399/9; 399/15
(58) Field of Classification Search
USPC ............ 358/1.9, 1.14, 1.15, 3.01, 3.06, 3.26, 358/406, 504, 474; 382/112; 399/9, 15
See application file for complete search history.

(56) References Cited

U.S. PATENT DOCUMENTS

| | | | |
|---|---|---|---|
| 5,317,368 A * | 5/1994 | Shimomura et al. | 399/12 |
| 6,377,758 B1 | 4/2002 | OuYang et al. | |
| 7,493,056 B2 * | 2/2009 | Katou | 399/9 |
| 7,676,703 B2 * | 3/2010 | Uwatoko et al. | 714/48 |
| 7,965,414 B2 * | 6/2011 | Wu et al. | 358/1.9 |
| 8,223,350 B2 * | 7/2012 | Mashtare et al. | 358/1.14 |
| 8,259,350 B2 * | 9/2012 | Wu et al. | 358/1.9 |
| 2003/0142985 A1 * | 7/2003 | Sampath et al. | 399/9 |
| 2005/0240376 A1 * | 10/2005 | Uwatoko et al. | 702/183 |
| 2006/0103899 A1 * | 5/2006 | Wu | 358/504 |
| 2006/0110009 A1 * | 5/2006 | Klassen et al. | 382/112 |

(Continued)

FOREIGN PATENT DOCUMENTS

JP     2007-116670     5/2007

OTHER PUBLICATIONS

Santos-Villalobos, Hector, et al., "A Web-Based Self-Diagnosis Tool to Solve Print Quality Issues", *IS&T's NIP22: International Conference on Digital Printing Technologies*, Sep. 17, 2006; pp. 465-471.

(Continued)

*Primary Examiner* — Kimberly A Williams
(74) *Attorney, Agent, or Firm* — Staas & Halsey LLP

(57) ABSTRACT

A host apparatus, an image forming apparatus, and a diagnosis method for the image forming apparatus, the diagnosis method including: storing a printing image generated from print data according to a printing command; and generating a diagnosis image for the printing image based on the stored printing image and a defect image corresponding to a predetermined defect of the image forming apparatus.

31 Claims, 23 Drawing Sheets

(56) References Cited

U.S. PATENT DOCUMENTS

| | | | |
|---|---|---|---|
| 2007/0195351 A1* | 8/2007 | Mashtare et al. | 358/1.13 |
| 2007/0237529 A1* | 10/2007 | Katou | 399/9 |
| 2008/0010522 A1* | 1/2008 | Uwatoko et al. | 714/23 |
| 2008/0013848 A1* | 1/2008 | Wu et al. | 382/254 |
| 2008/0137914 A1* | 6/2008 | Minhas | 382/112 |
| 2009/0185204 A1 | 7/2009 | Wu et al. | |
| 2009/0262380 A1* | 10/2009 | Puigardeu et al. | 358/1.14 |
| 2010/0020361 A1* | 1/2010 | Kim et al. | 358/406 |
| 2010/0124362 A1* | 5/2010 | Wu et al. | 382/112 |
| 2011/0228307 A1* | 9/2011 | Kott et al. | 358/1.14 |

OTHER PUBLICATIONS

Print Quality Troubleshooting Tool for HP Color LaserJet 4700—Home Page; http://www.hp.com/cpso-support-new/pg/4700/home.html, 2004, 2009; printed Feb. 19, 2009.

U.S. Office Action mailed Sep. 17, 2012 in related U.S. Appl. No. 12/571,967.

U.S. Notice of Allowance mailed Feb. 20, 2013 in related U.S. Appl. No. 12/571,967.

Chinese Office Action mailed May 24, 2013 in corresponding Chinese Patent Application 200910135123.5.

* cited by examiner

FIG. 10A

| 1 | 1 | 0 | 0 | 0 |
|---|---|---|---|---|
| 1 | 1 | 0 | 0 | 0 |
| 1 | 0 | 1 | 1 | 1 |
| 0 | 0 | 1 | 1 | 1 |
| 0 | 0 | 1 | 1 | 1 |

FIG. 10B

| 251 | 201 | 55  | 5   | 64  |
|-----|-----|-----|-----|-----|
| 216 | 145 | 111 | 36  | 121 |
| 26  | 83  | 173 | 234 | 163 |
| 12  | 59  | 197 | 248 | 211 |
| 21  | 116 | 140 | 225 | 154 |

FIG. 10C

| Img < 251 | Img < 201 | Img >= 55 | Img >= 5 | Img >= 64 |
|---|---|---|---|---|
| Img < 216 | Img < 145 | Img >= 111 | Img >= 36 | Img >= 121 |
| Img >= 26 | Img >= 83 | Img < 173 | Img < 234 | Img < 163 |
| Img >= 12 | Img >= 59 | Img < 197 | Img < 248 | Img < 211 |
| Img >= 21 | Img >= 116 | Img < 140 | Img < 225 | Img < 154 |

FIG. 10D

| 130 | 130 | 130 | 130 | 130 |
|---|---|---|---|---|
| 130 | 130 | 130 | 130 | 130 |
| 130 | 130 | 130 | 130 | 130 |
| 130 | 130 | 130 | 130 | 130 |
| 130 | 130 | 130 | 130 | 130 |

(a) PRINTING IMAGE (b) VERTICAL WHITE STREAK DEFECT IMAGE (c) DIAGNOSIS IMAGE (a) PRINTING IMAGE (b) BANDING DEFECT IMAGE (c) DIAGNOSIS IMAGE

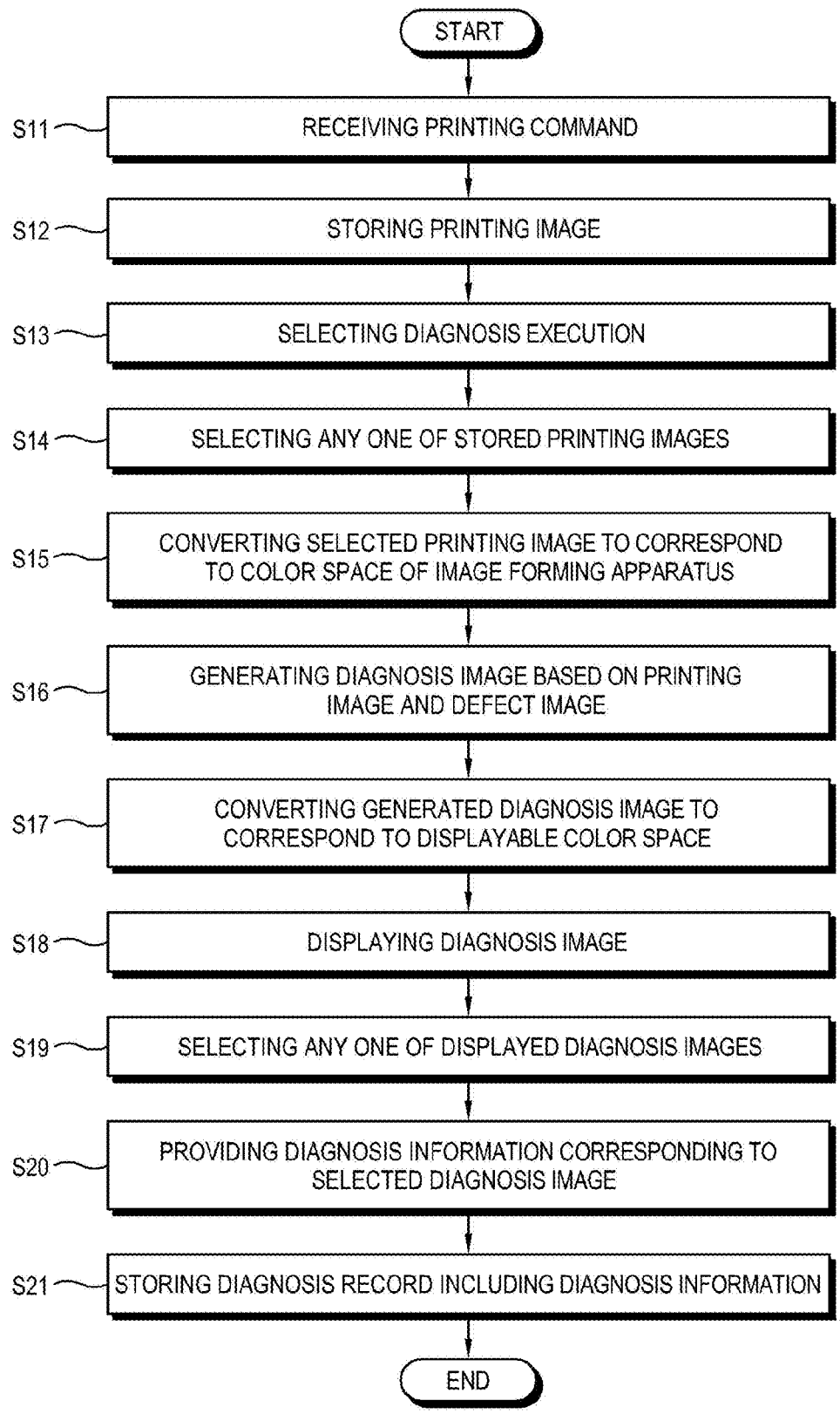

HOST APPARATUS, IMAGE FORMING APPARATUS, AND DIAGNOSIS METHOD FOR IMAGE FORMING APPARATUS

CROSS-REFERENCE TO RELATED APPLICATION

This application claims all benefits accruing under 35 U.S.C. §119 from Korean Patent Application No. 10-2008-0073624, filed on Jul. 28, 2008 in the Korean Intellectual Property Office, the disclosure of which is incorporated herein by reference.

BACKGROUND OF THE INVENTION

1. Field of the Invention

Aspects of the present invention relate to a host apparatus, an image forming apparatus, and a self-diagnosis method for the image forming apparatus.

2. Description of the Related Art

In general, an image forming apparatus (such as a printer, a facsimile, and a multi-functional device) performs printing on a print medium (such as a printing paper, a transparency, and film) of an image (such as a text and/or a picture) according to a user printing command. If any defect occurs in a printed matter while performing printing, a user may inspect a cause of the defect and fix the defect, or may request a repair service for the image forming apparatus from a manufacturer.

In the case of the repair service request, a manufacturer may provide a Printer Self Diagnosis System (PSDS) that can inspect the image forming apparatus remotely and fix the defect, to reduce the cost. In this case, the PSDS diagnoses information regarding the defect in a remote manner, and analyzes the type of the defect based on the diagnosis information to fix the defect occurring in the image forming apparatus.

A conventional PSDS of an image forming apparatus is designed such that a user accesses a website of a manufacturer through a communication network (such as the Internet), selects an image that most closely resembles a defect in question among printing images provided by the manufacturer, and provides a solution corresponding to the selected image to the user online.

In this way, the conventional PSDS diagnoses remotely based on printing images one-sidedly provided by a manufacturer. However, images provided online are difficult to identify and, thus, a user may select an incorrect image that is not related to the corresponding defect.

SUMMARY OF THE INVENTION

Aspects of the present invention provide a host apparatus, an image forming apparatus, and a diagnosis method for the image forming apparatus that generates an image for diagnosing a defect based on an image that is actually printed by a user. Aspects of the present invention also provide a host apparatus, an image forming apparatus and a diagnosis method for the image forming apparatus that diagnosis a defect by an application program on a personal computer, as well as online.

Additional aspects and/or advantages of the invention will be set forth in part in the description which follows and, in part, will be obvious from the description, or may be learned by practice of the invention.

In accordance with an example embodiment of the present invention, there is provided a diagnosis method for an image forming apparatus. Such a method includes: storing a printing image generated from print data according to a printing command; and generating a diagnosis image for the stored printing image based on the stored printing image and a defect image corresponding to a predetermined defect of the image forming apparatus.

According to an aspect of the present invention, the method may further include displaying the generated diagnosis image.

According to an aspect of the present invention, the method may further include selecting one of a plurality of displayed diagnosis images.

According to an aspect of the present invention, the method may further include providing diagnosis information corresponding to the selected diagnosis image.

According to an aspect of the present invention, the method may further include storing a diagnosis record comprising the diagnosis information.

According to an aspect of the present invention, the method may further including selecting one of a plurality of stored printing images, wherein the generating of the diagnosis image may include generating the diagnosis image for the selected printing image.

According to an aspect of the present invention, the stored printing image may be regularly or irregularly deleted to maintain a predetermined number of stored printing images.

According to an aspect of the present invention, if a number of the stored printing images exceeds a predetermined number, an oldest printing image may be deleted.

According to an aspect of the present invention, the stored printing image may be deleted when a predetermined time elapses after printing.

According to an aspect of the present invention, the generating of the diagnosis image may include generating a plurality of diagnosis images for a plurality of color channels, respectively.

According to an aspect of the present invention, the generating of the diagnosis image may include converting the selected printing image to correspond to a color space of the image forming apparatus, and generating the diagnosis image by synthesizing the converted printing image and the defect image.

According to an aspect of the present invention, the method may further include displaying a message for selecting diagnosis execution for the printing image.

According to an aspect of the present invention, the printing image may be a rendering image, a halftone image, or a capture image.

In accordance with another example embodiment of the present invention, there is provided an image forming apparatus performing a diagnosis for a printing image by the method as described above.

In accordance with yet another example embodiment of the present invention, there is provided a host apparatus to diagnose a defect in an image forming apparatus. Such an apparatus includes: an image processing part to generate a printing image from print data according to a printing command; a storage part to store a defect image corresponding to a predetermined defect of the image forming apparatus; and a controller to store the printing image in the storage part and to control the image processing part to generate a diagnosis image for the stored printing image based on the stored printing image and the defect image.

According to an aspect of the present invention, the apparatus may further include a display part to display the generated diagnosis image.

According to an aspect of the present invention, the apparatus may further include a user selection part to select one of a plurality of displayed diagnosis images.

According to an aspect of the present invention, the display part may provide diagnosis information corresponding to the selected diagnosis image.

According to an aspect of the present invention, the controller may store the diagnosis information in the storage part.

According to an aspect of the present invention, one of a plurality of stored printing images may be selected through the user selection part, and the controller may control the image processing part to generate a diagnosis image for the selected printing image.

According to an aspect of the present invention, the controller may regularly or irregularly delete the stored printing image to maintain a predetermined number of stored printing images.

According to an aspect of the present invention, if a number of the stored printing images exceeds a predetermined number, an oldest printing image may be deleted.

According to an aspect of the present invention, the stored printing image may be deleted when a predetermined time elapses after printing.

According to an aspect of the present invention, the controller may generate a plurality of diagnosis images for a plurality of color channels, respectively.

According to an aspect of the present invention, the controller may convert the selected printing image to correspond to a color space of the image forming apparatus, and may generate the diagnosis image by synthesizing the converted printing image and the defect image.

According to an aspect of the present invention, the display part may display a message for selecting diagnosis execution for the printing image.

According to an aspect of the present invention, the printing image may be a rendering image, a halftone image, or a capture image.

In accordance with still another example embodiment of the present invention, there is provided a host apparatus to diagnose a defect in an image forming apparatus. Such a host apparatus includes: an image processing part to generate a printing image from print data; and a controller to control the image processing part to generate a diagnosis image for the printing image based on the printing image and a defect image corresponding to a predetermined defect of the image forming apparatus.

In accordance with another example embodiment of the present invention, there is provided an image forming apparatus to diagnose a defect therein, including: an image processing part to process a printing image from print data; and a controller to control the image processing part to generate a diagnosis image for the printing image based on the printing image and a defect image corresponding to a predetermined defect of the image forming apparatus.

In accordance with another example embodiment of the present invention, there is provided a diagnosis method for an image forming apparatus, including: processing a printing image generated from print data; and generating a diagnosis image for the printing image based on the printing image and a defect image corresponding to a predetermined defect of the image forming apparatus.

In accordance with yet another example embodiment of the present invention, there is provided a system to diagnose a defect, including: an image forming apparatus to receive and to print print data; and a host apparatus to diagnose a defect in an image forming apparatus. Such a host apparatus includes: an image processing part to generate a printing image from the print data according, a storage part to store a defect image corresponding to a predetermined defect of the image forming apparatus, and a controller to control the image processing part to generate a diagnosis image for the printing image based on the printing image and the defect image.

In addition to the example embodiments and aspects as described above, further aspects and embodiments will be apparent by reference to the drawings and by study of the following descriptions.

BRIEF DESCRIPTION OF THE DRAWINGS

A better understanding of the present invention will become apparent from the following detailed description of example embodiments and the claims when read in connection with the accompanying drawings, all forming a part of the disclosure of this invention. While the following written and illustrated disclosure focuses on disclosing example embodiments of the invention, it should be clearly understood that the same is by way of illustration and example only and that the invention is not limited thereto. The spirit and scope of the present invention are limited only by the terms of the appended claims. The following represents brief descriptions of the drawings, wherein:

FIGS. 10A through 10D are diagrams illustrating a halftone image conversion according to an example embodiment of the present invention;

FIG. 16 is a flowchart illustrating a diagnosis method for an image forming apparatus according to an example embodiment of the present invention.

DETAILED DESCRIPTION OF THE EMBODIMENTS

Figure 1:
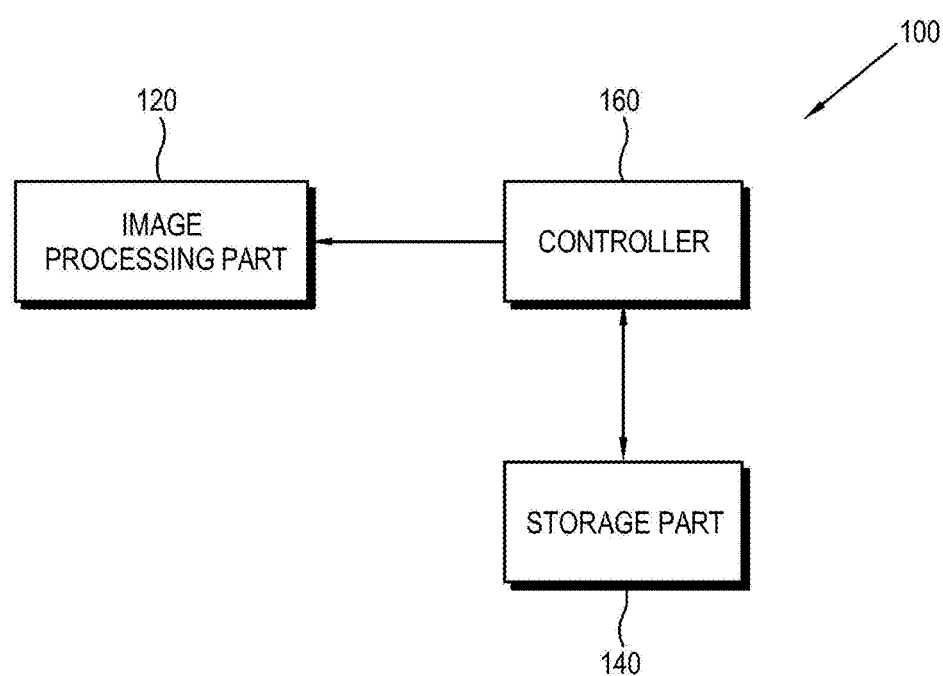
FIGS. 1 and 2 are block diagrams illustrating a host apparatus according to an example embodiment of the present invention.

Reference will now be made in detail to the present embodiments of the present invention, examples of which are illustrated in the accompanying drawings, wherein like reference numerals refer to the like elements throughout. The embodiments are described below in order to explain the present invention by referring to the figures.

Figure 2:
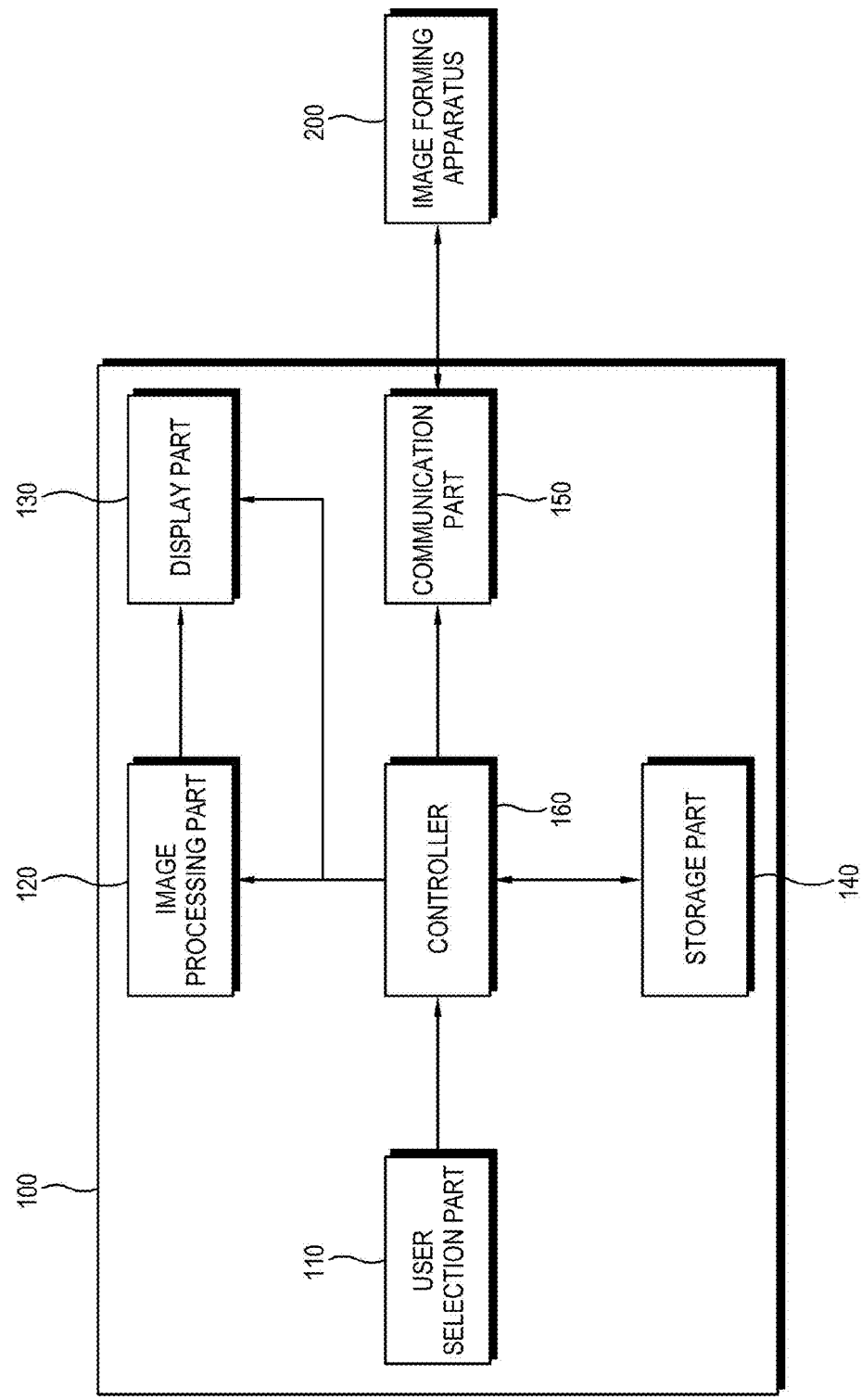

FIGS. 1 and 2 are block diagrams illustrating a host apparatus 100 according to an example embodiment of the present invention. The host apparatus 100 may be a personal computer that provides print data (such as texts, images, photographs, and combinations thereof) to an image forming apparatus 200 that prints the print data on a print medium (such as paper, transparencies, and film), and controls the image forming apparatus 200.

The host apparatus 100 is connected to at least one image forming apparatus 200, and may include a Printer Self Diagnosis System (PSDS) for the connected image forming apparatus 200. The PSDS may be realized by executing a printer driver installed in the host apparatus 100 or a separate application program.

Referring to FIG. 1, the host apparatus 100 includes an image processing part 120, a storage part 140, and a controller 160. Referring to FIG. 2, the host apparatus 100 may further include a user selection part 110, a display part 130 and a communication part 150.

The user selection part 110 enables a user to select whether to execute a PSDS for the image forming apparatus 200. Specifically, if the host apparatus 100 receives a printing command for the image forming apparatus 200, the controller 160 may select execution of the PSDS through, for example, a user input via the user selection part 110. The user selection part 110 may a mouse, a keyboard, etc., and/or may include a user interface (UI) generated by executing a printer driver and displayable through the display part 130. That is, if the host apparatus 100 receives a printing command from a user, the host apparatus 100 calls a printer driver or a separate application program, and provides a UI to inspect whether a printed matter from the image forming apparatus 200 has a defect for the user. If the printing matter has a defect, the user may select execution of a PSDS for the image forming apparatus 200 through the UI. If the user selects execution of the PSDS for the image forming apparatus 200, the host apparatus 100 selects, through the user selection part 110, a printing image stored in the storage part 140 or a diagnosis image generated by the image processing part 120.

Furthermore, the host apparatus 100 may perform a PSDS by executing an application program or a printer driver so that a user can perform the PSDS through the user selection part 110 irrespective of receipt of a printing command.

The image processing part 120 generates a printing image according to a printing command. When executing a PSDS, the image processing part 120 generates a diagnosis image for at least one printing image based on the printing image and a defect image stored in the storage part 140, or in an external storage unit (such as a flash memory). The generated printing image and diagnosis image may be stored in the storage part 140, or in an external storage unit (such as a flash memory).

Figure 3:
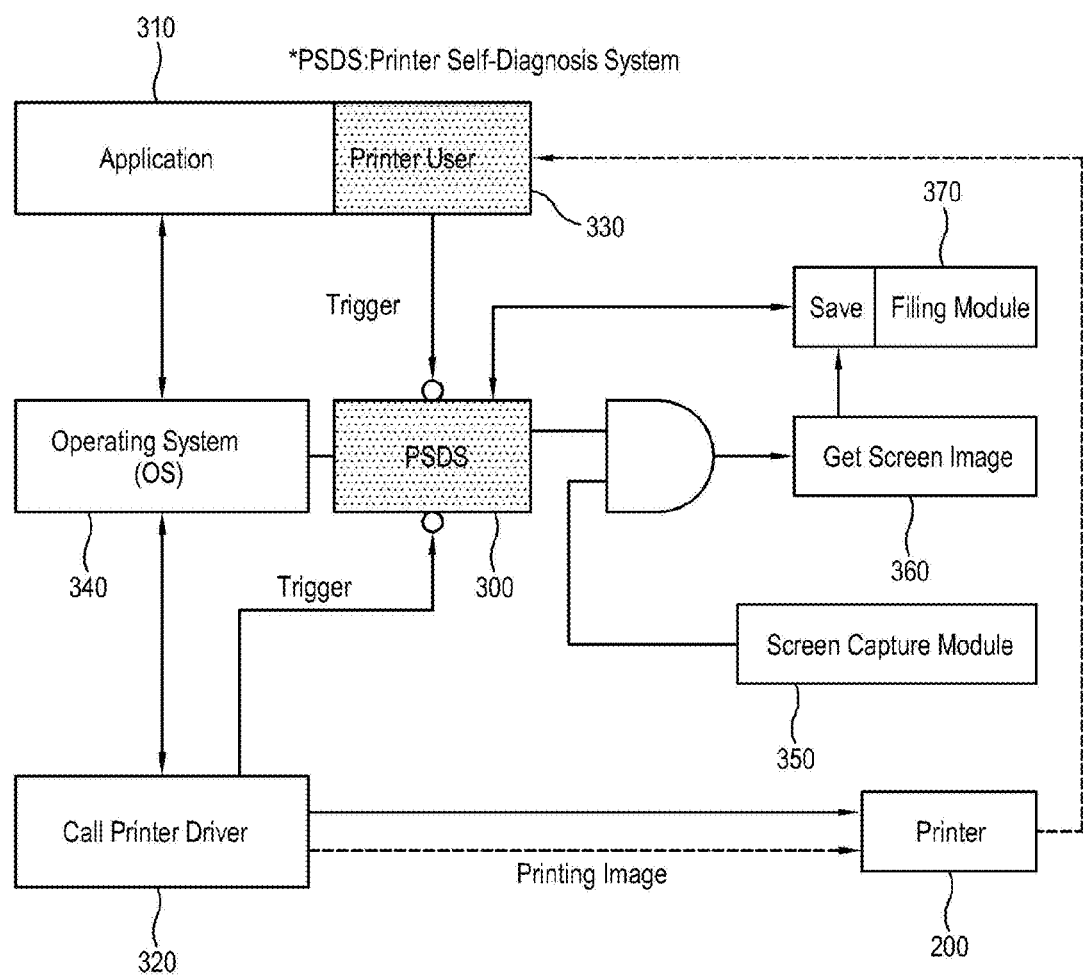
FIGS. 3 through 9 are diagrams illustrating printing images generated according to an example embodiment of the present invention.

FIGS. 3 through 9 are diagrams illustrating printing images generated according to an example embodiment of the present invention. As described above, the host apparatus 100 may perform the PSDS 300 by executing an application program 310 or a printer driver 320 (via an operating system (OS) 340) so that a user 330 can perform the PSDS 300 through the user selection part 110 irrespective of receipt of a printing command. Referring to FIG. 3, a screen capture module 350 of the image processing part 120 generates a capture image 360 for a screen displayed on the display part 130 as a printing image according to a printing command. For example, the capture image 360 may be generated by capturing the whole monitor screen that a user 330 currently views through a "Print Screen" button on a keyboard, or by capturing a region on a screen designated by a user 330 through a separate mouse capture application program (for example, SNAG-IT). Furthermore, a filing module 370 may save the capture image 360.

Figure 4:
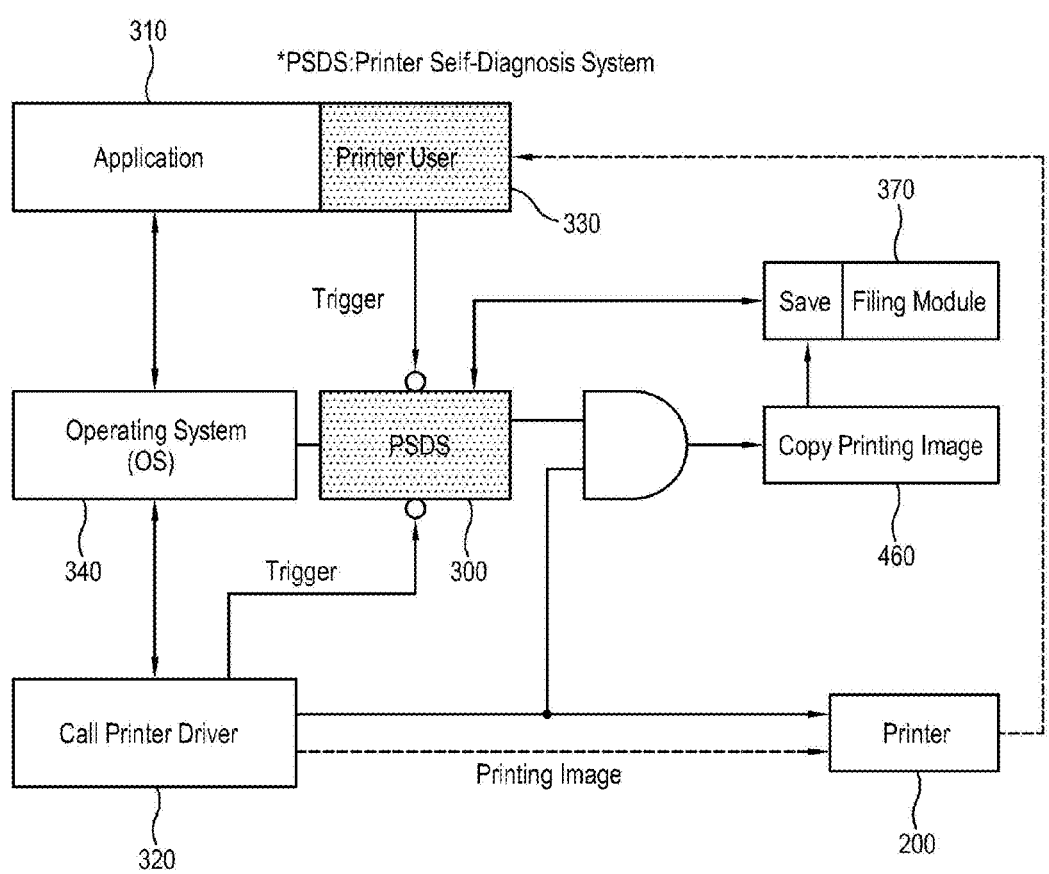

As shown in FIG. 4, the image processing part 120 generates a printing image 460 in a printer language (such as Graphics Device Interface (GDI), Printer Command Language (PCL) and PostSript (PS)) according to a printing command. The generated printing image 460 is transmitted to the image forming apparatus 200 for printing. The host apparatus 100 copies the printing image 460 transmitted to the image forming apparatus 200 and stores the copied printing image 460 in the storage part 140, or an external storage unit (such as a flash memory).

Figure 5:
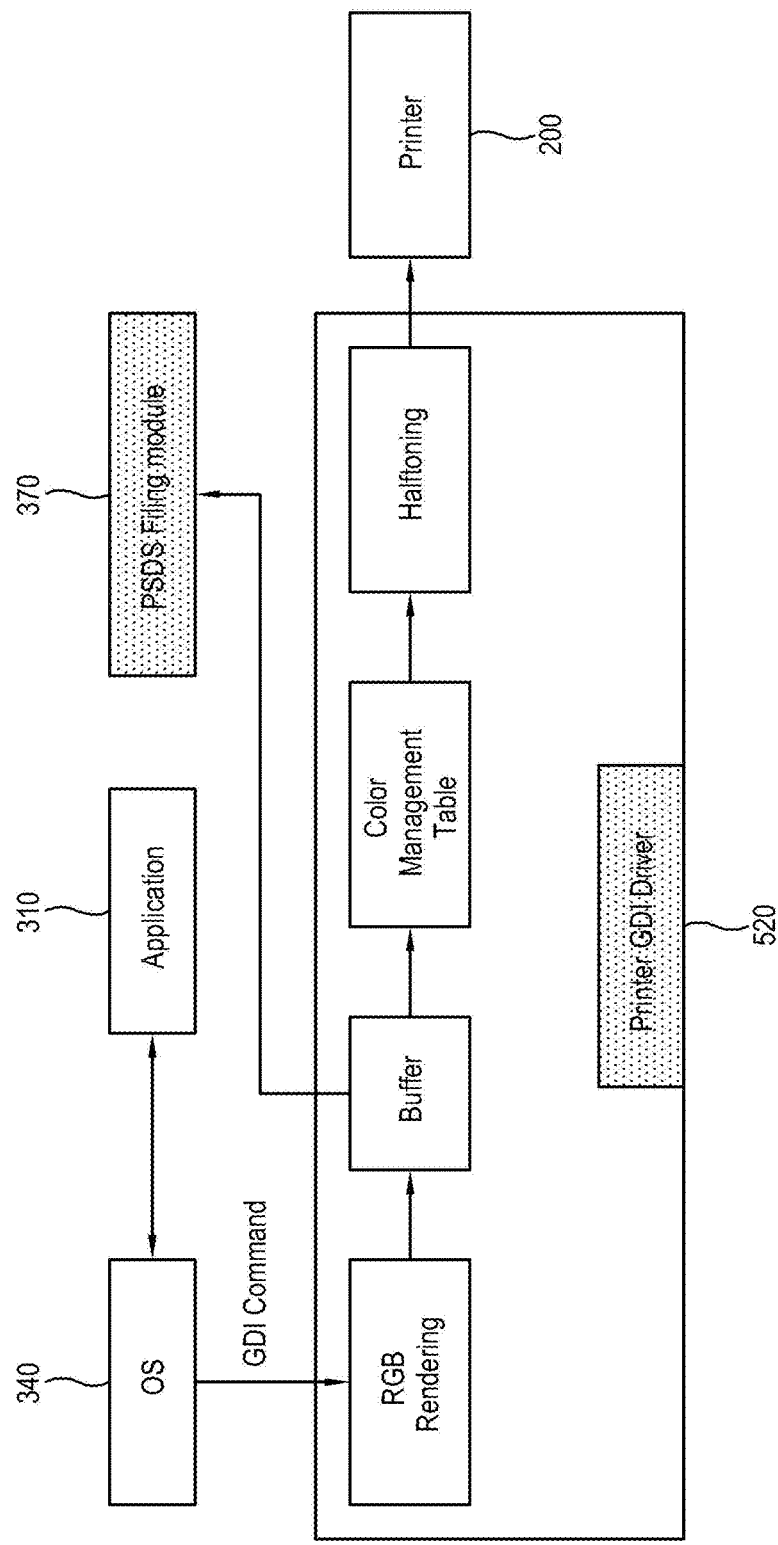
Figure 6:
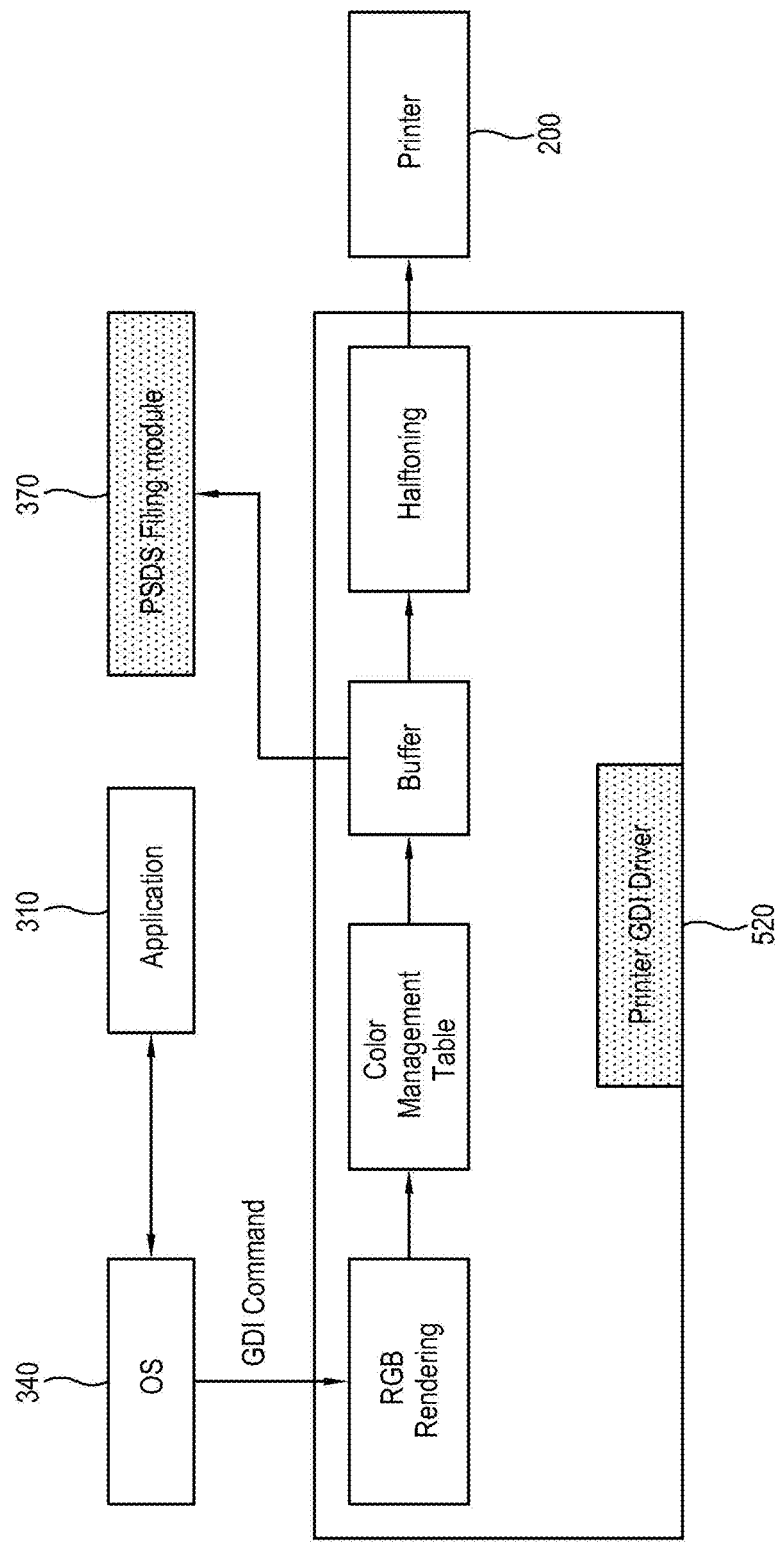
Figure 7:
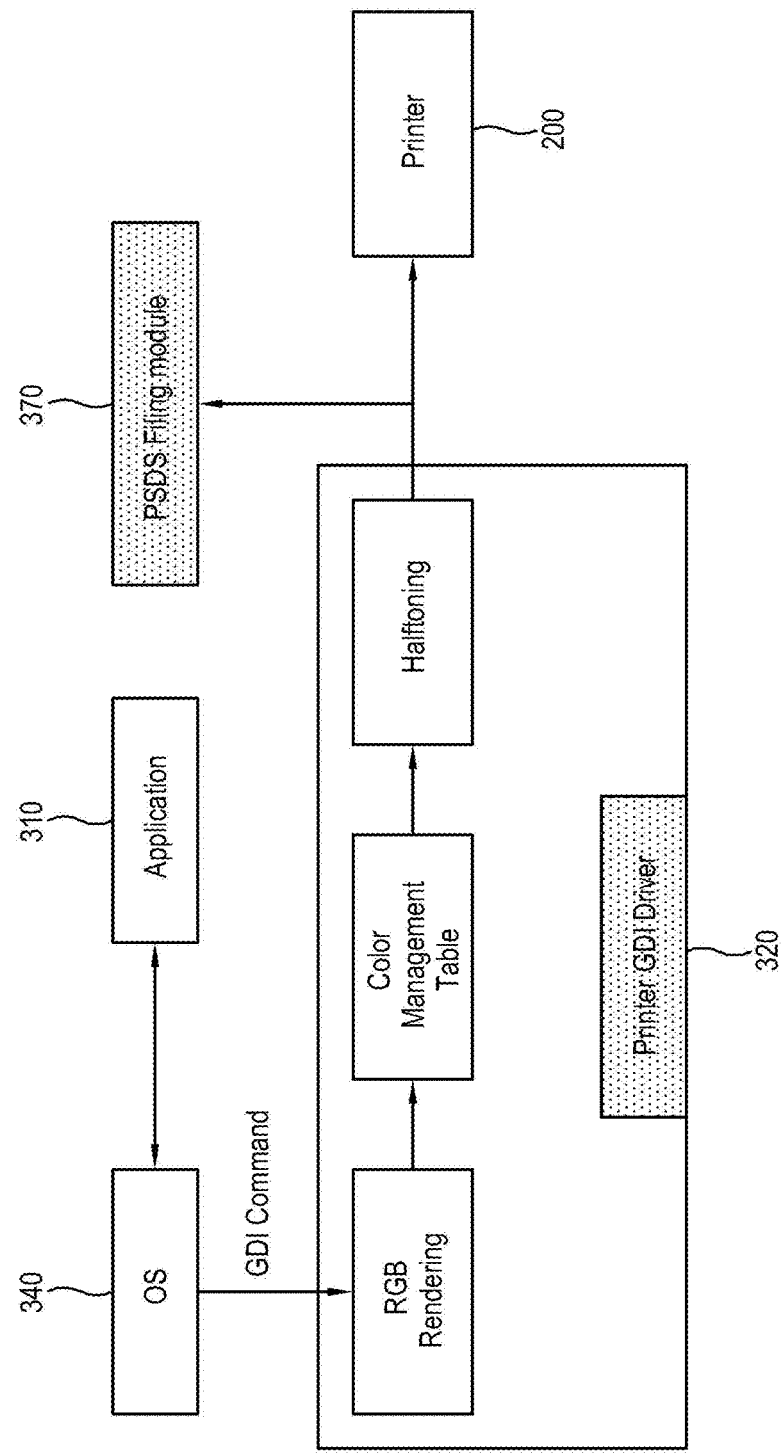

FIGS. 5 to 7 illustrate a case where a GDI driver 520 is used. Referring to FIGS. 5 to 7, the printing image may include a rendering image or a halftone image. Specifically, as shown in FIG. 5, the host apparatus 100 may store an RGB rendering image as a printing image, or may store a CMYK rendering image converted from an RGB rendering image as a printing image. In this respect, the controller 160 (or OS 340) may control the image processing part 120 to convert an RGB printing image into a CMYK image or to convert a CMYK printing image into an RGB image to correspond to a color space of a diagnosis image to be described later.

Further, as shown in FIG. 7, the host apparatus 100 may store a halftone image as a printing image. If a printing image is a halftone image, the controller 160 (or OS 340) may control the image processing part 120 to convert the halftone image into an RGB image.

FIGS. 10A through 10D are diagrams illustrating a halftone image conversion according to an example embodiment of the present invention. If a printing image is a halftone image, the halftone image can be converted into an RGB rendering image (hereinafter, referred to as a contone image) of 8 bits. This conversion from a halftone image to a contone image is called H2C.

Figure 10A:
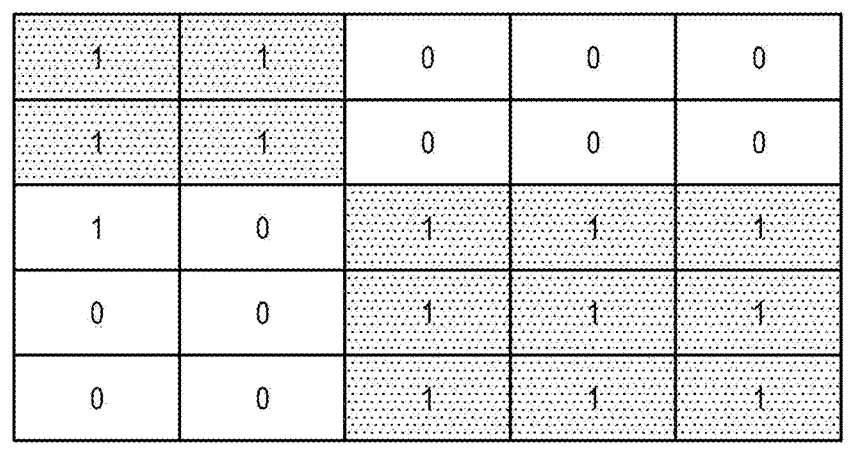

More specifically, referring to FIG. 10A, if the host apparatus 100 uses a GDI driver and a printing image is a halftone image (or a print (Ready-to-Print) file of a PRN format) of 8 bits or less (for example, 1 bit, 2 bits or 4 bits), the controller reads a halftone table (see FIG. 10B) used for conversion of the corresponding halftone image. In this respect, a used halftone algorithm may be as follows:

If Image Pixel Value(8 bit)<Halftone Threshold Value
Then, Dot "ON"="1"
else Dot "OFF"="0"

By way of example, it is assumed that the halftone image has an image pixel value of 8 bits. Referring to FIGS. 10C and 10D, the lowest threshold is 140 in a pixel with halftone image data being 1, and the highest threshold value is 121 in a pixel with halftone image data being 0. Therefore, in the example embodiment, a contone image value of 8 bits satisfies the following:

121<8 bit image pixel value<140

Accordingly, a halftone image of 1 bit in FIG. 10A is restored as a contone image of 8 bits. The restored image pixel vale may be determined as (121+140)/2.

In the above H2C restoring process, a region having the same pixel value of an image to be restored is the same as a cell size of a halftone table (i.e., a region in which threshold values do not overlap each other with respect to a dot center during halftoning or dithering). Moreover, the restored contone image may be more or less different from an RGB rendering image of 8 bits before halftoning according to a resolution and a cell size of the halftone table (i.e., the level of halftone gradation (printing resolution)).

Figure 8:
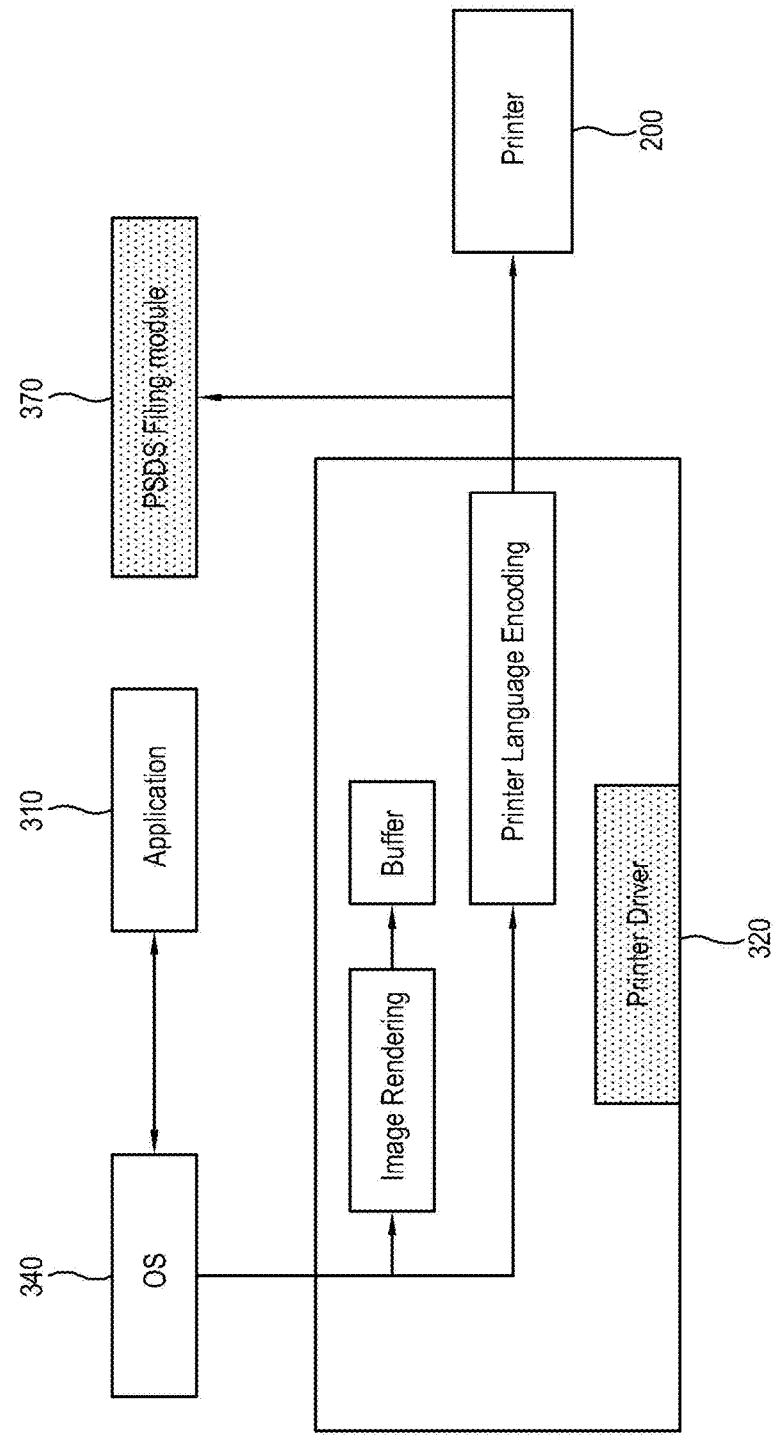
Figure 9:
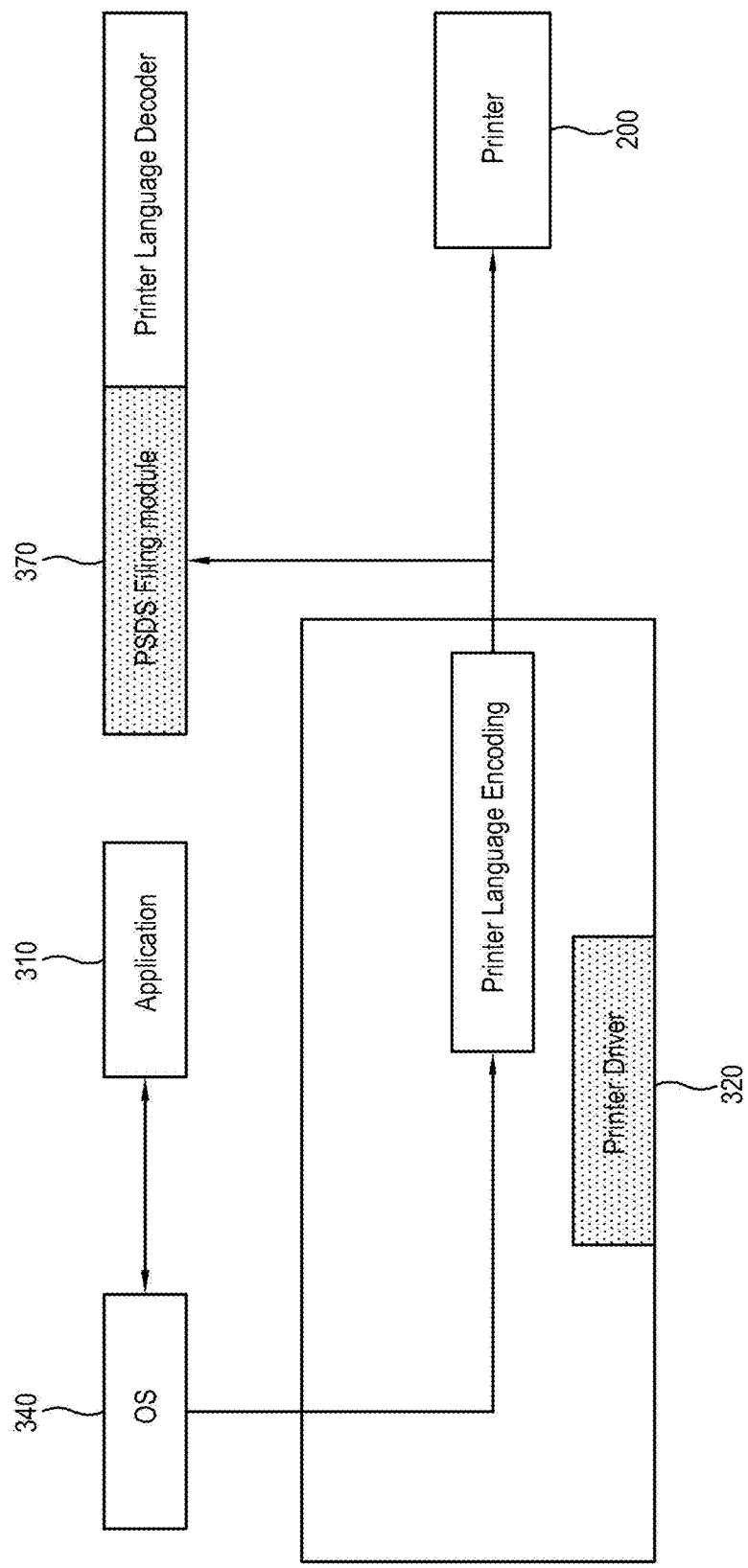

It is understood that aspects of the present invention are not limited to the GDI printer language, as described above. For example, according to other aspects, the host apparatus 100 may use a printer language such as PCL and PS, instead of GDI, to provide a printing image for the image forming apparatus 200. In particular, the host apparatus 100 may store an image before encoding by a printer language as a printing image as shown in FIG. 8, or may store an image encoded by a printer language as a printing image as shown in FIG. 9. In the case that a printing image is an encoded image, a decoding process for the printing image is performed, as shown in FIG. 9.

Figure 11A:
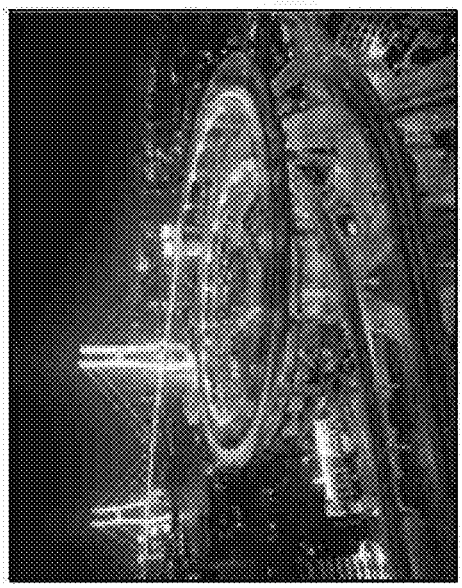
FIGS. 11A through 11C and 12A through 12C are diagrams illustrating diagnosis images generated according to an example embodiment of the present invention.
Figure 11B:
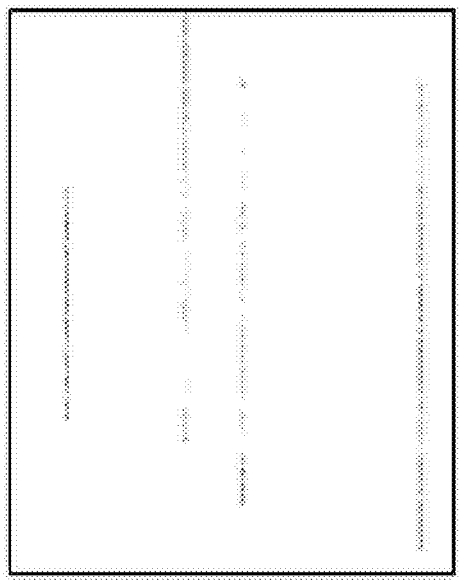
Figure 11C:

As stated above, the image processing part 120 generates a diagnosis image for a printing image based on the printing image and a previously stored defect image. FIGS. 11A through 11C and 12A through 12C are diagrams illustrating diagnosis images generated according to an example embodiment of the present invention. More specifically, the controller 160 controls the image processing part 120 to generate a diagnosis image (FIG. 11C) based on a printing image (FIG. 11A) and a defect image (FIG. 11B). As an example, the defect image (FIG. 11B) corresponds to vertical white streaks generated when foreign substances are present on a developing roller or a laser scanning unit (LSU) of the image forming apparatus 200.

Figure 12A:
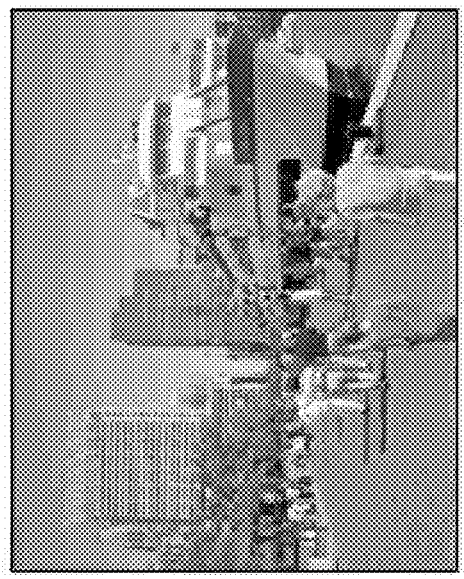
Figure 12B:
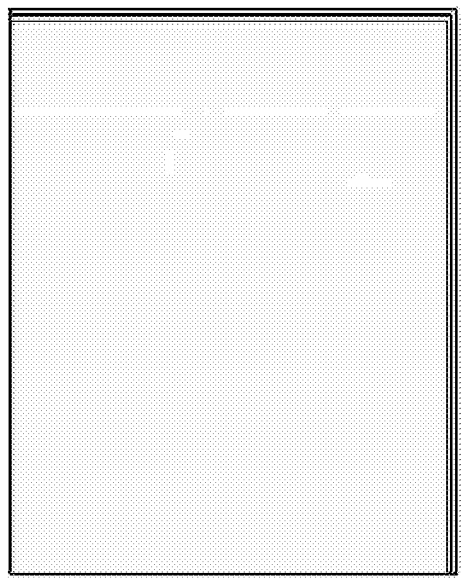
Figure 12C:
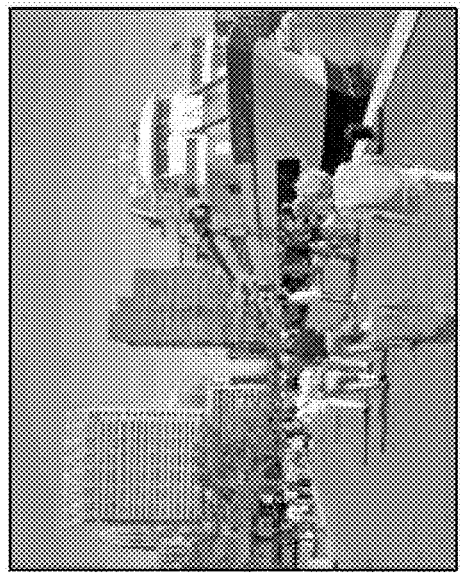

Similarly, the controller 160 controls the image processing part 120 to generate a diagnosis image ((c) of FIG. 12) based on a printing image (FIG. 12A) and a defect image (FIG. 12B). The defect image (FIG. 12B) corresponds to banding or jitter of an image that may result from excessive speed variation of a photosensitive medium, or the like.

In generating such a diagnosis image (FIG. 12C), the controller 160 may control the image processing part 120 to generate a diagnosis image (FIG. 12C) of an RGB color space by synthesizing a printing image of the RGB color space and a defect image, or to generate a diagnosis image (FIG. 12C) of a CMYK color space by synthesizing a printing image of the CMYK color space and a defect image. If a diagnosis image is generated in the CMYK color space (i.e., a color space of the image forming apparatus 200 is a CMYK color space), a diagnosis image (FIG. 12C) similar to a defect actually occurring due to physical causes can be generated.

For example, in order to generate a diagnosis image (FIG. 12C) based on a banding defect occurring in a K-developing roller corresponding to a black toner in the image forming apparatus 200 having the CMYK color space, if a printing image corresponds to an RGB color space, the controller 160 controls the image processing part 120 to convert the printing image to correspond to the CMYK color space using an RGB2CMYK color table. Furthermore, the controller 160 controls the image processing part 120 to synthesize and merge a printing image of a K-plane and a previously stored defect image to correspond to the CMYK color space. If diagnosis images are generated for a plurality of color channels in this way, it can be determined in which developing roller the defect occurred among the plurality of developing rollers. Moreover, it is understood that the conversion process from RGB to CMYK can be omitted in aspects of the present invention if a printing image is stored to correspond to the CMYK color space.

The diagnosis image generated to correspond to the CMYK color space is converted to correspond to a color space (for example, RGB color space) displayable in the host apparatus 100. In this respect, the controller 160 may use a previously stored profile for matching with the image forming apparatus 200 and an output color in the display part 10 through which the diagnosis image is displayed.

Figure 13:
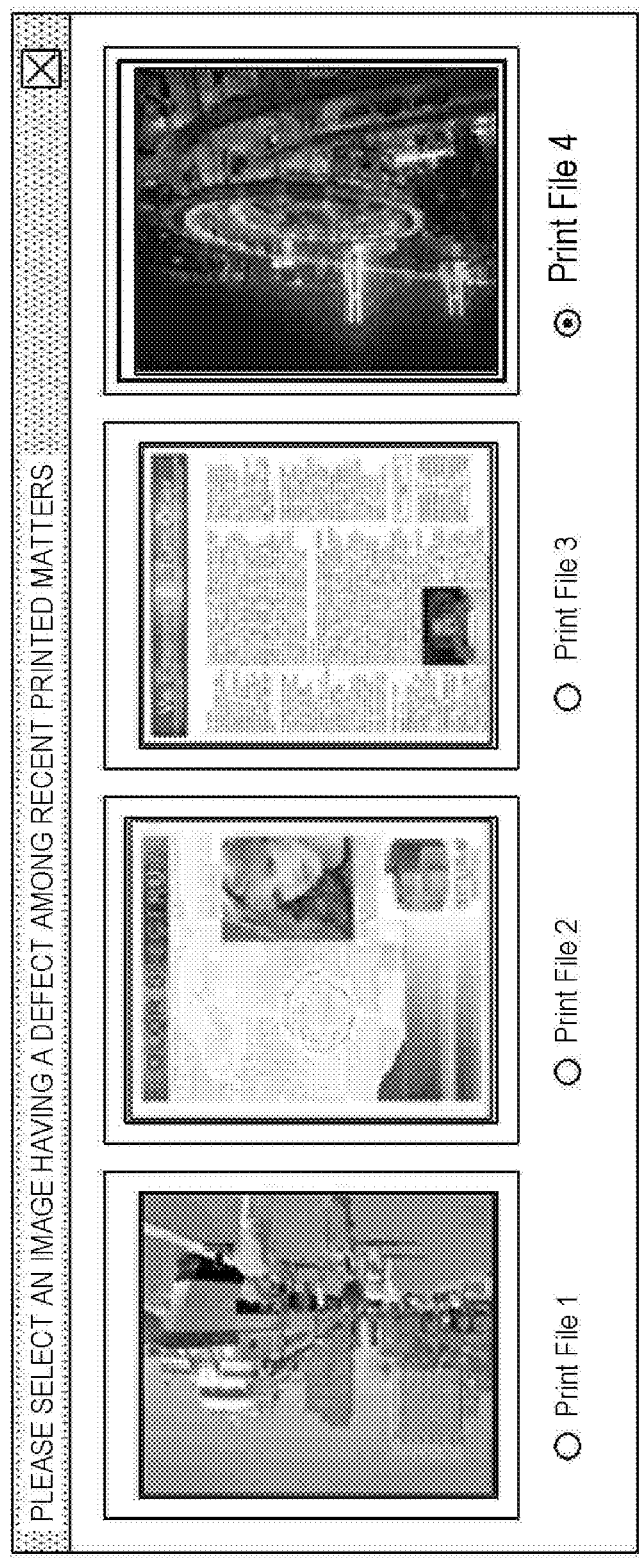
FIG. 13 illustrates printing images displayed according to an example embodiment of the present invention.
Figure 14:
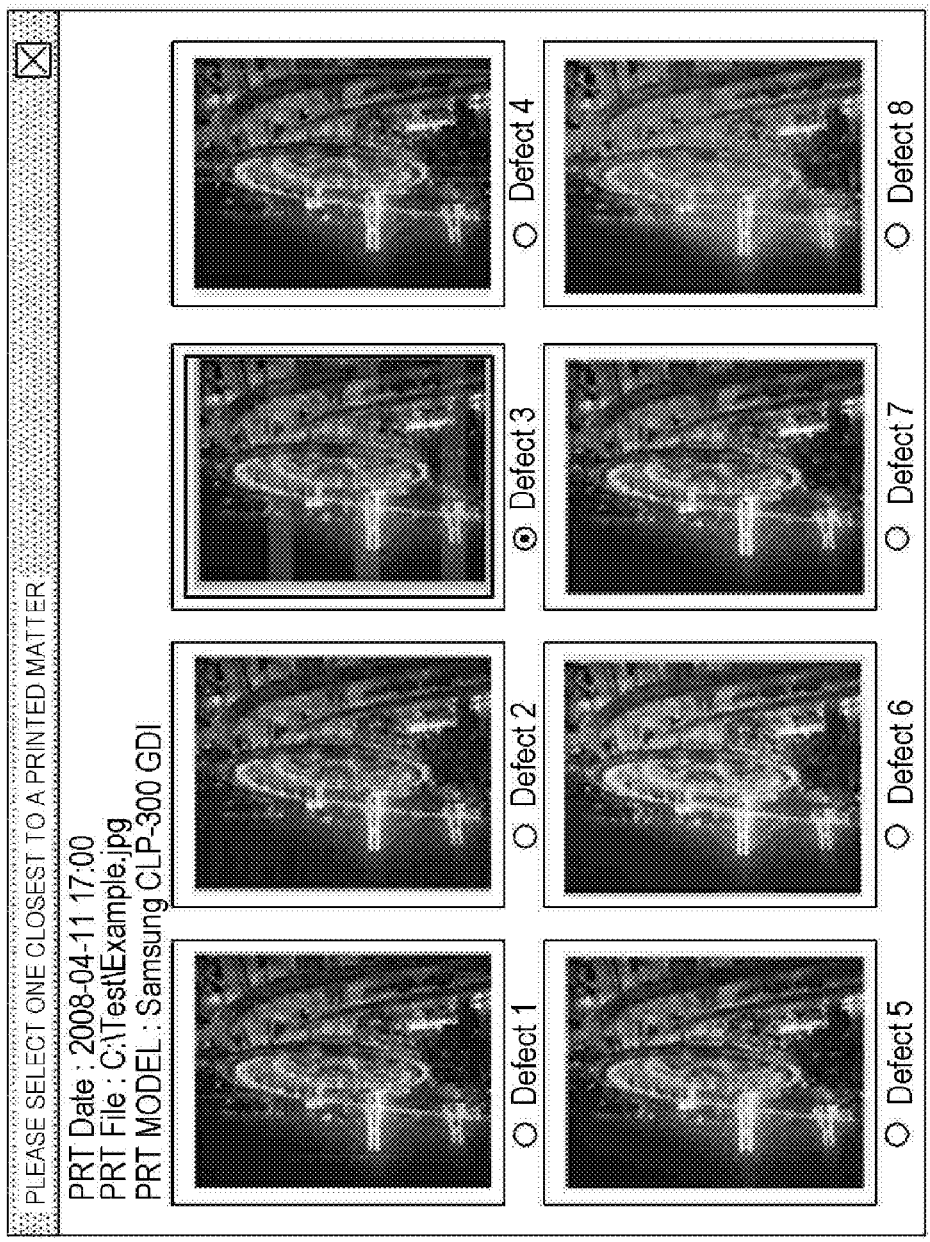
FIGS. 14 and 15 illustrate diagnosis images displayed according to an example embodiment of the present invention.

It is understood that aspects of the present invention are not limited to the above-described RGB2CMYK color table. For example, the host apparatus 100 may use a general RGB2CMYK conversion method such as Under Color Removal (UCR) for printing image conversion, instead of the RGB2CMYK color table. An example of the general RGB2CMYK conversion is as follows:

//%% Value Range: CMYK values=[0.0, 1.0] && %%
Where RGB values=[0, 255]
c=1.0−(r/255.0);   m=1.0−(g/255.0);   y=1.0−(b/255.0);
var_K=1.0;
if (c<var_K) var_K=c;
if (m<var_K) var_K=m;
if (y<var_K) var_K=y;
if (var_K==1) {c=0.0; m=0.0; y=0.0;}
else {
c=(c−var_K)/(1.0−var_K);
m=(m−var_K)/(1.0−var_K);
y=(y−var_K)/(1.0−var_K);} k=var_K;

An example of a CMYK2RGB conversion method is as follows:

//%% Value Range: CMYK values=[0.0, 1.0] && %%
Where RGB values=[0, 255]
c=(c*(1.0−k)+k); m=(m*(1.0−k)+k); y=(y*(1.0−k)+k);
R=(1.0−c)*255.0; G=(1.0−m)*255.0; B=(1.0−y)*255.0;

The display part 130 displays a stored printing image, a stored defect image, and a generated diagnosis image to a user. In this respect, the display part 130 may display a UI to select a printing image and a diagnosis image. FIG. 13 illustrates printing images displayed according to an example embodiment of the present invention, and FIGS. 14 and 15 illustrate diagnosis images displayed according to an example embodiment of the present invention.

As shown in FIG. 13, if a PSDS is selected for the image forming apparatus 200, the controller 160 controls the display part 130 to display printing images stored in the storage part 140 (or externally). In this respect, the number of the displayed printing images may be set by a user or may be set as a default value. If any one of the displayed printing images is selected through the user selection part 110, the controller 160 controls the display part 130 to display diagnosis images generated according to the selected printing image and defect images stored in the storage part 140.

Figure 15:
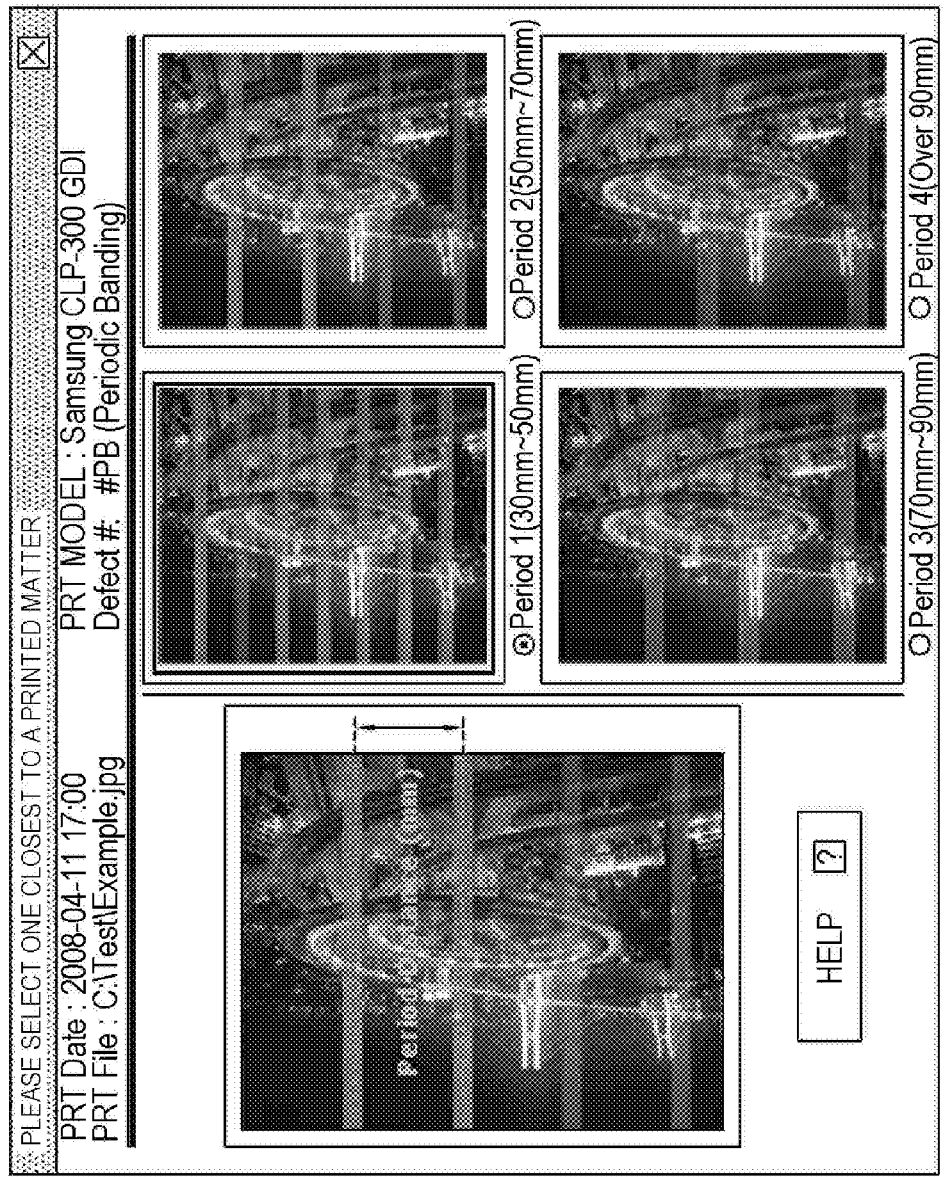

If a displayed diagnosis image is selected through the user selection part 110, the controller 160 may control the display part 130 to display diagnosis information on the selected diagnosis image or to display a more detailed diagnosis image for the selected diagnosis image, as shown in FIG. 15. Alternatively, the controller 160 may control the display part 130 to display both the diagnosis image and the diagnosis information on the diagnosis image, as shown in FIG. 15.

The displayed diagnosis information may include information about a document (such as an instruction manual) or a moving picture from which a user can easily learn a solution to the defect, a phone number of a department (manufacturer or service provider) in charge of defect solution, a map and a website address, a web-page link that a user can access for an online defect solution, an e-mail address and an e-phone number of personnel in charge of repair service, and/or the like.

The display part 130 may, although not necessarily, be a TFT-LCD and a driving part (not shown) for driving the TFT-LCD. The storage part 140 may be a volatile memory (such as RAM) or a non-volatile memory (such as ROM, flash memory, or a hard disk drive). Accordingly, the storage part 140 stores at least one printing image and at least one defect image. Specifically, if a printing command is input by a user, the controller 160 stores a corresponding printing image in the storage part 140. The stored printing image may be a rendering image, a halftone image, or a capture image. Furthermore, the rendering image may correspond to an RGB or CMYK color space. Also, the controller 160 may store the printing image in a default position (for example, an installation position of a printer driver such as C:

\WINDOWS\system32\spool or C:\WINDOWS\system32\spool\drivers\w32x86\3\temp) or a position selected by a user.

The stored printing image may be deleted regularly or irregularly to maintain a predetermined number. That is, if a new printing image is generated according to a printing command, the controller 160 may regularly or irregularly delete previous printing images corresponding to previously performed printing operations to maintain the predetermined number of printing images stored in the storage part 140. For example, if a predetermined number of printing images to be stored is five, and the storage part 140 stores five previous printing images, the controller 160 deletes a printing image corresponding to the oldest printing operation from the storage part 140 and stores a printing image generated according to a new printing command if the new printing command is received. Accordingly, the five printing images starting from the newest printing image can be sequentially stored in the storage part 140 by irregular deletion, to thereby maintain the predetermined number of printing images.

However, it is understood that aspects of the present invention are not limited thereto. For example, the controller 160 may periodically delete a printing image when a predetermined time elapses after performing printing for the printing image stored in the storage part 140. Furthermore, the stored printing image may be deleted after a specific time preset in the host apparatus 100, or may be deleted by selection of a user. In this way, recent printing images can be maintained in the storage part 140. Moreover, a number of the printing images stored in the storage part 140 may be set according to the capacity of the storage part 140 or may be set by a user. The capacity of the storage part 140 may vary depending on the number, size, resolution, and/or the like of stored printing images.

The storage part 140 also stores defect images corresponding to defects that may occur in the image forming apparatus 200. The defect images may be stored according to predetermined defect categories.

The storage part 140 may also store a diagnosis record including diagnosis information corresponding to a diagnosis image generated based on a printing image and a defect image and a selected diagnosis image. The diagnosis image may correspond to an RGB or a CMYK color space. The stored diagnosis record may be used when a similar defect occurs later in the image forming apparatus 200 or when desired by a manager or a user.

The communication part 150 transmits a printing image to the image forming apparatus 200 according to a printing command. The communication part 150 may be a wired and/or wireless communication module, such a USB port, an infrared port, a Bluetooth port, etc.

The controller 160 controls the overall operations of the host apparatus 100. That is, the controller 160 stores a printing image generated according to a printing command in the storage part 140, and controls the image processing part 120 to generate a diagnosis image based on a stored printing image and a stored defect image when execution of PSDS is selected.

As shown in FIG. 13, the controller 160 may display stored printing images on the display part 130 as a user selectable UI. If a user selects a printing image on the displayed UI via the user selection part 110, the controller 160 controls the image processing part 120 to generate a diagnosis image based on the selected printing image and a defect image stored in the storage part 140. Furthermore, the controller 160 may display the generated diagnosis image and/or diagnosis information on the display part 130, as shown in FIGS. 14 and 15.

As described above, the controller 160 may control the image processing part 120 to convert a printing image into an image of an RGB or a CMYK color space according to a color space of a stored printing image. With this configuration, the host apparatus 100 according to aspects of the present invention can generate and display a diagnosis image using a printing image actually printed by a user.

Hereinafter, a diagnosis process of the image forming apparatus 200 in the above-configured host apparatus 100 will be described with reference to FIG. 16. Referring to FIG. 16, the host apparatus 100 receives a printing command from a user in operation S11.

Then, the controller 160 stores a printing image corresponding to the printing command in the storage part 140 in operation S12. The stored printing image may be a rendering image, a halftone image, or a capture image. The number of stored printing images may be predetermined and, to this end, may be regularly or irregularly deleted by the controller 160.

According to the printing command in operation S11, the controller 160 displays a message for selecting diagnosis execution for the image forming apparatus 200 through the display part 130 in operation S13. If diagnosis execution for the image forming apparatus 200 is selected in operation S13, the controller 160 displays stored printing images on the display part 130 so that a displayed printing images can be selected in operation S14.

The controller 160 converts the selected printing image to correspond to a color space (for example, CMYK color space) of the image forming apparatus 200 in operation S15. However, it is understood that according to other aspects, the stored printing images may already be converted.

The controller 160 controls the image processing part 120 to generate diagnosis images based on the selected printing image and stored defect images in operation S16. In this respect, the diagnosis images may be generated for a plurality of color channels, respectively. The generated diagnosis image is converted to correspond to a color space (for example, RGB color space) that can be displayed through the display part 130 in operation S17. However, it is understood that according to other aspects, the diagnosis images are generated to be in the proper color space.

The generated diagnosis images are displayed on the display part 130 in operation S18. Then, one of the displayed diagnosis images is selected through the user selection part 110 in operation S19. Accordingly, the controller 160 provides diagnosis information corresponding to the selected diagnosis image for a user through the display part 130 in operation S20. Moreover, the controller 160 stores a diagnosis record for the image forming apparatus 200 in the storage part 140 in operation S21.

According to another example embodiment of the present invention, the above-described diagnosis process is performed in the image forming apparatus 200, instead of the host apparatus 100. Specifically, a storage part is provided in the image forming apparatus 200 to store a printing image and one or more defect images. A diagnosis image is generated based on the stored printing image and defect images and is displayed through a UI of the image forming apparatus 200 to a user. If a user selects a displayed diagnosis image through the UI, the image forming apparatus 200 provides diagnosis information corresponding to the selected diagnosis image to a user. Such a diagnosis record may be stored in the storage part of the image forming apparatus 200. Additionally or alternatively, the image forming apparatus 200 may transmit the diagnosis information to a host apparatus or a terminal device of a user.

Aspects of the present invention can also be embodied as computer-readable codes on a computer-readable recording medium. Also, codes and code segments to accomplish the present invention can be easily construed by programmers skilled in the art to which the present invention pertains. The computer-readable recording medium is any data storage device that can store data which can be thereafter read by a computer system or computer code processing apparatus. Examples of the computer-readable recording medium include read-only memory (ROM), random-access memory (RAM), CD-ROMs, magnetic tapes, floppy disks, and optical data storage devices. The computer-readable recording medium can also be distributed over network-coupled computer systems so that the computer-readable code is stored and executed in a distributed fashion. Aspects of the present invention may also be realized as a data signal embodied in a carrier wave and comprising a program readable by a computer and transmittable over the Internet.

While there have been illustrated and described what are considered to be example embodiments of the present invention, it will be understood by those skilled in the art and as technology develops that various changes and modifications, may be made, and equivalents may be substituted for elements thereof without departing from the true scope of the present invention. Many modifications, permutations, additions and sub-combinations may be made to adapt the teachings of the present invention to a particular situation without departing from the scope thereof. For example, though the diagnosis method is described above as being performed through a host apparatus 100, it is understood that some or all of the method can be performed through the image forming apparatus 200 according to other example embodiments of the present invention. For example, an image forming apparatus 200 may include a storage part and an image processing part to generate a diagnosis image from a received printing image and a received or stored defect image. Accordingly, it is intended, therefore, that the present invention not be limited to the various example embodiments disclosed, but that the present invention includes all embodiments falling within the scope of the appended claims.

What is claimed is:

1. A diagnosis method to determine defects of an image forming apparatus, the diagnosis method comprising:
   transmitting a printing image generated from print data according to a printing command to the image forming apparatus for printing;
   copying and storing the transmitted printing image;
   generating a diagnosis image for the stored printing image by synthesizing the stored printing image and at least one of a plurality of defect images of the image forming apparatus,
   wherein the plurality of defect images are previously stored corresponding to a plurality of defects, respectively, which are occurred in the image forming apparatus.

2. The method as claimed in claim 1, further comprising displaying the generated diagnosis image.

3. The method as claimed in claim 1, wherein the generating of the diagnosis image comprises: generating a first diagnosis image for the printing image by synthesizing the stored printing image and a first previously stored defect image of the image forming apparatus; and generating a second diagnosis image for the printing image by synthesizing the stored printing image and a second previously stored defect image of the image forming apparatus.

4. The method as claimed in claim 3, further comprising selecting one of the diagnosis images.

5. The method as claimed in claim 4, further comprising providing diagnosis information corresponding to the selected diagnosis image.

6. The method as claimed in claim 1, further comprising: providing diagnosis information corresponding to the diagnosis image; and storing a diagnosis record comprising the diagnosis information.

7. The method as claimed in claim 1, further comprising: selecting one of a plurality of stored printing images, wherein the generating of the diagnosis image comprises generating the diagnosis image for the selected printing image.

8. The method as claimed in claim 7, wherein the generating of the diagnosis image for the selecting printing image comprises: converting the selected printing image to correspond to a color space of the image forming apparatus; and generating the diagnosis image by synthesizing the converted printing image and the defect image.

9. The method as claimed in claim 1, wherein the stored printing image is regularly or irregularly deleted to maintain a predetermined number of stored printing images.

10. The method as claimed in claim 9, further comprising: deleting an oldest printing image if a number of the stored printing images exceeds the predetermined number.

11. The method as claimed in claim 9, further comprising: deleting the stored printing image when a predetermined time elapses after printing.

12. The method as claimed in claim 1, wherein the generating of the diagnosis image comprises: generating a first diagnosis image for the printing image for a first color channel; and generating a second diagnosis image for the printing image for a second color channel, respectively.

13. The method as claimed in claim 1, further comprising displaying a message for selecting diagnosis execution for the printing image.

14. The method as claimed in claim 1, wherein the printing image is a rendering image, a halftone image, or a capture image.

15. The method as claimed in claim 1, wherein: the storing of the printing image comprises receiving, in the image forming apparatus, the printing image from a host apparatus and storing the printing image in the image forming apparatus; and the generating of the diagnosis image comprises generating the diagnosis image in the image forming apparatus.

16. The method as claimed in claim 1, wherein: the storing of the printing image comprises storing, in a host apparatus different from the image forming apparatus, the printing image in the image forming apparatus; and the generating of the diagnosis image comprises generating the diagnosis image in the host apparatus.

17. A host apparatus to diagnose a defect in an image forming apparatus, the host apparatus comprising:
   an image processing part to generate a printing image from print data according to a printing command;
   a communication part to transmit the generated printing image to the image forming apparatus for printing;
   a storage part to store a previously stored defect image of the image forming apparatus;
   a controller to copy and store the transmitted printing image in the storage part and to control the image processing part to generate a diagnosis image for the printing image by synthesizing the stored printing image and at least one of a plurality of defect images,
   wherein the plurality of defect images are previously stored corresponding to a plurality of defects, respectively, which are occurred in the image forming apparatus.

18. The apparatus as claimed in claim 17, further comprising a display part to display the generated diagnosis image.

19. The apparatus as claimed in claim 18, wherein the display part displays a message to select diagnosis execution for the printing image.

20. The apparatus as claimed in claim 17, further comprising a user selection part to select one of the diagnosis images.

21. The apparatus as claimed in claim 20, wherein the display part provides diagnosis information corresponding to the selected diagnosis image.

22. The apparatus as claimed in claim 21, wherein the controller stores the diagnosis information in the storage part.

23. The apparatus as claimed in claim 17, wherein the controller regularly or irregularly deletes the stored printing image to maintain a predetermined number of stored printed images in the storage part.

24. The apparatus as claimed in claim 23, wherein the controller deletes an oldest printing image if a number of the stored printing images exceeds the predetermined number.

25. The apparatus as claimed in claim 23, wherein the controller deletes the stored printing image when a predetermined time elapses after printing.

26. The apparatus as claimed in claim 17, wherein the controller controls the image processing part to generate a first diagnosis image for the printing image for a first color channel and a second diagnosis image for the printing image for a second color channel.

27. The apparatus as claimed in claim 17, wherein one of a plurality of stored printing images, stored in the storage part, is selected through the user selection part, and the controller generates a diagnosis image for the selected printing image.

28. The apparatus as claimed in claim 27, wherein the controller converts the selected printing image to correspond to a color space of the image forming apparatus, and controls the image processing part to generate the diagnosis image by synthesizing the converted printing image and the defect image.

29. The apparatus as claimed in claim 17, wherein the printing image is a rendering image, a halftone image, or a capture image.

30. An image forming apparatus to diagnose a defect therein, the image forming apparatus comprising:
    an image processing part to process a printing image from print data;
    a controller to control the image processing part to copy and store the processed printing image in a storage part and to generate a diagnosis image for the stored printing image based on the printing image and at least one of a plurality of defect images of the image forming apparatus,
    wherein the plurality of defect images are previously stored corresponding to a plurality of defects, respectively, which are occurred in the image forming apparatus.

31. The apparatus as claimed in claim 30, wherein the controller to control the image processing part to generate the diagnosis image by synthesizing the printing image and the at least one of a plurality of previously stored defect images.

* * * * *